United States Patent [19]
Parsen et al.
[11] 4,350,745
[45] Sep. 21, 1982

[54] ELECTROCHEMICAL CELLS HAVING HYDROGEN GAS ABSORBING AGENT

[75] Inventors: Frank E. Parsen, Irvington, N.Y.; Thomas T. Yatabe, Oakville, Canada
[73] Assignee: Duracell Inc., Bethel, Conn.

[21] Appl. No.: 220,615
[22] Filed: Dec. 29, 1980
[51] Int. Cl.[3] .............................................. H01M 10/52
[52] U.S. Cl. .............................................. 429/57; 429/40; 429/86
[58] Field of Search ........................ 429/57, 86, 40, 42, 429/224; 252/471, 459, 182.1; 423/248

[56] References Cited

U.S. PATENT DOCUMENTS

| | | | |
|---|---|---|---|
| 3,261,714 | 7/1966 | Kordesch et al. | 429/190 X |
| 3,939,006 | 2/1976 | Kozawa | 429/57 |
| 4,054,727 | 10/1977 | O'Nan et al. | 429/86 |
| 4,216,274 | 8/1980 | Bruning et al. | 429/57 |
| 4,224,384 | 9/1980 | Kozawa et al. | 429/57 |
| 4,259,666 | 2/1981 | Kozawa | 429/57 |
| 4,279,972 | 7/1981 | Moses | 429/57 X |

*Primary Examiner*—Anthony Skapars
*Attorney, Agent, or Firm*—Ronald S. Cornell; Israel Nissenbaum

[57] ABSTRACT

An agent which absorbs hydrogen gas for electrochemical cells is made from an oxide of manganese and nickel, cobalt or iron. At temperatures above about 40° C., the oxide of manganese can be replaced by lead oxide. Hydrophobic binders can be added to the agent or the agent can be microencapsulated in water-impermeable but hydrogen-gas-permeable materials. The agent is preferably added to the cell in the form of small agglomerates or microcapsules.

21 Claims, No Drawings

ELECTROCHEMICAL CELLS HAVING HYDROGEN GAS ABSORBING AGENT

FIELD OF THE INVENTION

This invention relates to an agent for absorbing hydrogen gas and more particularly to a new and inexpensive agent useful in electrochemical cells.

BACKGROUND OF THE INVENTION

Hydrogen gas is generated by many devices during both use and storage and generally adversely affects the operation of the device. Further, hydrogen gas build-up within sealed devices can cause the devices to distort by expanding or the devices may rupture.

One device wherein unwanted hydrogen gas may be detrimentally generated is an electrochemical cell. Such gas generation may occur during storage, discharge and, in the case of secondary cells, during charge. The reasons for hydrogen gas generation are varied and include corrosion of the various cell components and overcharging. When hydrogen gas evolution cannot be stopped and the gas cannot be vented, its detrimental effects may be negated by absorption thereof.

The prior art has suggested several means for absorbing hydrogen gas evolved in batteries. Kordesch et al., in U.S. Pat. No. 3,261,714 issued July 9, 1966, discloses an auxiliary electrode for such absorption which is porous and treated with a hydrogen ionization catalyst such as platinum, rhodium, palladium and iridium.

Kozawa, in U.S. Pat. No. 3,939,006 issued Feb. 17, 1976, discloses including a discrete body within an electrochemical cell. The body has an outer casing of a hydrogen permeable membrane with the material within the membrane including specific metal oxides and specific catalysts. The catalysts include the same catalysts as disclosed by Kordesch et al., i.e., platinum, palladium and rhodium ("noble metals") and a few highly reactive compounds or alloys of Group VIII metals such as nickel boride and Raney nickel.

Kozawa et al., in U.S. Pat. No. 4,224,384 issued Sept. 23, 1980, disclose a hydrogen gas absorber for an electrochemical cell consisting of silver catalyzed manganese dioxide.

The known means of absorbing hydrogen disclosed in the prior art specifically require noble metal or silver catalysts for their effectiveness. In fact Kozawa specifically notes that $MnO_2$ alone is ineffective in absorbing hydrogen. Silver and these noble metal catalysts, particularly platinum, are however expensive and greatly increase the cost of any electrochemical cells or other devices in which they may be used. The highly reactive metal compounds and alloys previously used such as nickel boride and Raney nickel are similarly expensive and are also difficult to properly handle and use.

THE INVENTION

It has now been discovered that an agent for absorbing hydrogen gas may be made without noble metals or Group VIII metal component catalysts. Though materials such as manganese dioxide have been described in the prior art as being useless when not used in conjunction with a catalyst, mixtures of manganese oxide, hydroxide or lead oxide with one or more of non-noble metals, specifically elemental nickel, cobalt or iron which are not generally considered to be catalysts, nevertheless they provide adequate hydrogen absorption in electrochemical cells. One agent of the present invention comprises an oxide of manganese, such as manganese dioxide ($MnO_2$), and/or manganese hydroxide ($MnOOH$), admixed with an amount of powdered nickel of up to about 40 percent by weight of the total mixture. Such admixture can absorb hydrogen at or above room temperature without the expensive noble metal or metal compound catalysts which have been previously required. Another example of a hydrogen absorbing agent of the present invention comprises lead dioxide ($PbO_2$) admixed with an amount of powdered nickel of up to about 40 percent by weight of the total mixture. Such admixture has been found to be effective in absorbing hydrogen gas even at temperatures above 40° C.

The agent of the present invention may be added to the cell or other device in the form of, for example, a pellet or agglomerates of various dimensions. The agent may also be in an encapsulated form or may contain binders and/or hydrophobic but hydrogen permeable materials. The agent may be located anywhere within the cell or device whereby it is in a position to easily absorb any hydrogen gas that is generated.

DESCRIPTION OF THE PREFERRED EMBODIMENTS

A preferred agent of the present invention comprises from about 40 to about 5 percent by weight powdered elemental nickel admixed with from about 60 to about 95 percent by weight manganese dioxide ($MnO_2$) and/or manganese hydroxide ($MnOOH$), or lead dioxide ($PbO_2$). Most preferably the nickel comprises from about 25 to about 15 percent by weight of the mixture of nickel with the remaining about 75 to about 85 percent by weight being the oxide. The agent containing manganese dioxide or hydroxide has the greatest utility at or above room temperature whereas the agent containing lead dioxide has greater utility at tempertures above about 40° C.

The agent of the present invention can be compressed into one large mass of any desired shape which is added to a cell, but is preferably formed into small agglomerates which can be added to the cathode and/or electrolyte of the cell or combined with the material to be formed into the cathode or anode. A small quantity (generally less than about five percent but generally more than about 0.05 percent) of a hydrophbic material may be admixed with the agent before it is compressed or agglomerated. The hydrophobic material, when admixed with the agent of the present invention, helps to prevent the flooding of the reaction sites of the agent and which may occur in some embodiments wherein quantities of liquids are present. Such hydrophobic materials include fluoroplastics, such as polytetrafluoroethylene, other plastics, resins, waxes, as well as other hydrophobic materials inert to the environment to which the agent will be exposed. These materials must however be permeable to hydrogen gas. The agent can therefore be in the form of agglomerates which can be directly, initially combined with other components of the device or may be simply added to the device as desired.

Alternatively, the agent of the present invention, can be microencapsulated in a hydrogen permeable material such as porous sintered polytetrafluoroethylene, unsintered polytetrafluoroethylene, unsintered polytetrafluoroethylene, polyethylene, polyvinyl chloride and mixtures of these materials. Such a layer permits hydrogen gas to pass through it while it does not permit any liquid, such as an electrolyte solution, to flood the reaction sites of the agent and prevent the operation of the agent. In an electrochemical cell these small capsules can be situated wherever they will be exposed to evolved hydrogen gas such as in contact with the electrolyte, in proximity to the current collector element of the cell, or even may form part of an electrode.

Small capsules (e.g. microballoons) or small agglomerates are preferred over a single or a few large capsules or agglomerates since the small agglomertates or small capsules can be readily mixed with the various components of the device during manufacture such as with the material which is to be formed into the cathode or added to the electrolyte. The small agglomerates also provide a greater amount of accessible reaction sites for more rapid absorption of generaed hydrogen.

Manganese dioxide ($MnO_2$) useful in the present invention, such as ground naturally occurring ore, should preferably have a small particle size to enhance absorption. A preferred powder should be able to pass through a 325 mesh screen ($4.4\times10^{-3}$ cm wire openings). The manganese hydroxide (MnOOH) (which can be produced by chemically reducing manganese dioxide to manganese hydroxide) and the lead dioxide ($PbO_2$) useful in the present invention should also preferably be a powder which can pass through the 325 mesh screen.

The nickel, cobalt or iron used in the present invention should preferably be finely powdered. A method of forming such finely powdered metals is by chemically precipitating the metal which produced metal particles of very small size. The most preferable powder has an average particle size of less than 10 microns ($1\times10^{-5}$ meters).

When encapsulating or hydrophobic materials are employed with the agent, the reactivity of the oxides and metals of the agent towards the device into which the agent is incorporated is of relatively small significance. The encapsulating material or hydrophobic additive acts to separate the active components of the agent from the other components of the device permitting only the hydrogen gas to come into contact with the active components of the agent. The encapsulating and hydrophobic materials useful in the present invention are themselves generally inert to most environments including those environments found in aqueous electrochemical cells. Encapsulation of the agent of the present invention is preferred where the agent is to be used in those electrochemical cells or other devices having components which may detrimentally react with the oxide and/or metals of the agent.

Electrochemical cells in which the agent of the present invention are useful include those wherein hydrogen gas may be detrimentally produced as described in "The Primary Battery", Vol. 1, Ed. E. G. Heise and N. C. Cahoon (New York: John Wiley and Sons, Inc., 1971) and "The Primary Battery", Vol. II, Ed. N. C. Cahoon and E. G. Heise (New York: John Wiley and Sons, Inc., 1976). Typical cells subject to hydrogen evolution include those having acid or alkaline electrolytes, various oxides as cathodes, and anodes formed of metals or of certain oxides. One widely used cell wherein the present invention is of particular utility comprises a zinc anode, an electrolyte including an aqueous solution of potassium hydroxide, a porous separator, and a cathode including manganese dioxide and graphite; i.e., the common "alkaline cell".

The use of the agent of the present invention in electrochemical cells having a zinc anode is particularly advantageous because the mercury, which is generally used to prevent gassing in such cells, can be significantly reduced or omitted since the agent itself absorbs the hydrogen gas produced within the cell. The elimination of the mercury provides the beneficial effect of reducing environmental problems in the manufacture and disposal of such cells.

The agent of the present invention is also useful in other devices which can generate hydrogen gas such as capacitors.

The invention will be more fully understood from the following examples which are illustrative only and are not intended to limit the scope of the invention.

EXAMPLE 1

An agent of the present invention is formed by combining 80 percent by weight of manganese dioxide ($MnO_2$) powder, having a density of 5.0 gm/cm$^3$, with 20 percent by weight of powdered nickel. The mixture is compressed and the resulting slug is granulated to form agglomerates. The agglomerates have an average diameter of about 2.2 millimeters, density of about 5.5 gm/cm$^3$ and a porosity of about 40 percent.

When the agglomerated agent is exposed to hydrogen gas at room temperature it shows an average rate of hydrogen absorption of about 1.3 cm$^3$ per gram per day. The total absorptive capacity of the agent is about 110 cm$^3$ per gram.

The use of this agent in an electrochemical cell, having a zinc anode which produces 0.02 cm$^3$ of hydrogen gas per gram of zinc per day, requires a minimum of about 0.015 gram of agent per gram of zinc. In cells where the zinc or other cell component produces larger quantities of hydrogen gas more agent will be necessary.

EXAMPLE 2

The agent of Example 1 is tested at 43° C., and is found to have an average rate of hydrogen absorption of about 2.8 cm$^3$ per gram per day and a total absorptive capacity of about 180 cm$^3$ per gram.

EXAMPLE 3

An agent of the present invention is formed as in Example 1. When the agglomerates are moistened with a solution of potassium hydroxide (KOH) which is generally used in alkaline cells, the absorptive rate and capacity are not affected thus indicating utility within such cell.

EXAMPLE 4

An agent of the present invention is formed as in Example 1, except that the manganese dioxide is replaced by manganese hydroxide (MnOOH). The resulting agglomerates have substantially the same absorptive rate and total absorptive capacity as the agglomerates of Example 1.

EXAMPLE 5

An agent of the present invention is formed by combining 80 percent by weight lead oxide ($PbO_2$) powder with 20 percent by weight powdered nickel. The mixture is pressed into a slug and granulated to form agglomerates having an average diameter of 2.6 mm and a density of about 9.3 gm/cm$^3$. At room temperature the agglomerates are found to have substantially no hydrogen absorption capacity. However, at 43° C. the agglomerates display an average rate of hydrogen absorption of about 0.4 $cm^3$ per gram per day and a total absorptive capacity of approximately 40 $cm^3$ per gram.

Manganese dioxide not admixed with nickel does not absorb hydrogen gas. Other metal oxides, including mercuric oxide (HgO) and cupric oxide (CuO) utilized by Kozawa in U.S. Pat. No. 3,939,006, as well as other materials as nickel oxide ($Ni_2O_3$) and barium manganate ($BaMnO_4$) do not become absorbers of hydrogen gas even when combined with nickel powder.

The above examples are illustrative only and are not intended to limit the invention which is set forth in the following claims.

What is claimed is:

1. An electrochemical cell comprising an anode, a cathode, an electrolyte, and an agent for absorbing hydrogen gas, all operatively associated, said agent comprising a mixture of a member of the group consisting of an oxide of manganese and an oxide of lead; and a powered metal selected from the group consisting of nickel, cobalt and iron.

2. The cell of claim 1 wherein said agent comprises a mixture of an oxide of manganese and a powdered metal selected from the group consisting of nickel, cobalt, and iron.

3. The cell of claim 2 wherein the oxide of manganese is selected from the group consisting of manganese dioxide ($MnO_2$) and manganese hydroxide (MnOOH).

4. The cell of claim 2 wherein the metal comprises nickel.

5. The cell of claim 2 wherein the agent further comprises a hydrophobic material.

6. The cell of claim 5 wherein the hydrophobic material comprises from about 0.05 percent to about 5 percent by weight of the mixture of polytetrafluoroethylene.

7. The cell of claim 2 wherein the agent is in the form of a multiplicity of agglomerates.

8. THe cell of claim 2 wherein the metal comprises an effective amount up to about 25 percent by weight of the mixture.

9. The cell of claim 2 and further comprising a hydrogen gas permeable, liquid impermeable material encapsulating the mixture.

10. The cell of claim 2 wherein said anode comprises zinc.

11. The cell of claim 2 wherein said anode consists essentially of zinc without amalgamation thereof.

12. The cell of claim 7 wherein the agglomerates have an average size of 2.2 millimeters.

13. The cell of claim 2 wherein the anode comprises zinc, the electrolyte comprises an aqueous solution of potassium hydroxide, the cathode comprises manganese dioxide and the agent comprises a mixture of manganese dioxide and powdered nickel, in the form of a plurality of agglomerates.

14. The cell of claim 1 wherein said agent is operable at temperatures above about 40° C. and comprises a mixture of a lead oxide and a powdered metal selected from the group consisting of nickel, cobalt and iron.

15. The cell of claim 14 wherein the metal comprises nickel.

16. The cell of claim 14 wherein the lead oxide comprises lead dioxide ($PbO_2$).

17. The cell of claim 14 wherein the mixture further comprises a hydrophobic material.

18. The cell of claim 14 and further comprising a hydrogen gas permeable, liquid impermeable material encapsulating the mixture.

19. The cell of claim 14 wherein the anode comprises zinc, the electrolyte comprises an aqueous solution of potassium hydroxide, the cathode comprises manganese dioxide, and the agent comprise a mixture of lead dioxide, and powdered nickel in the form of a plurality of agglomerates.

20. The cell of claim 14 wherein said anode comprises zinc.

21. The cell of claim 14 wherein said anode consists essentially of zinc without amalgamation thereof.

* * * * *